United States Patent [19]

Berg et al.

[11] Patent Number: 5,080,575

[45] Date of Patent: Jan. 14, 1992

[54] ADJUSTABLE VALVE STEM APPARATUS FOR VALVE GATED INJECTION MOLDING DEVICES

[75] Inventors: Ralph O. Berg; Fred J. Lang, Jr., both of Rochester; Dennis B. Kupka, Albion, all of N.Y.

[73] Assignee: Eastman Kodak Company, Rochester, N.Y.

[21] Appl. No.: 702,665

[22] Filed: May 17, 1991

[51] Int. Cl.⁵ .............................................. B29C 45/38
[52] U.S. Cl. .................................... 425/564; 137/315; 251/266
[58] Field of Search ................ 137/315, 15; 251/265, 251/266; 425/191, 192, 564, 566

[56] References Cited

U.S. PATENT DOCUMENTS

| | | | |
|---|---|---|---|
| 1,495,964 | 5/1924 | Reid | 251/266 X |
| 2,784,934 | 3/1957 | Paulius et al. | 251/265 |
| 3,262,465 | 7/1966 | Gillberg | 251/266 X |
| 3,553,788 | 1/1971 | Putkowski | 425/192 |
| 3,648,718 | 3/1972 | Curran | 137/315 X |
| 3,799,182 | 3/1974 | Long | 137/15 |
| 4,171,941 | 10/1979 | Yotsutsuji et al. | 425/566 X |
| 4,483,512 | 11/1984 | Drapeau | 251/265 |
| 4,588,163 | 5/1986 | Christensen | 251/285 |
| 4,801,051 | 1/1989 | Lewis et al. | 222/309 |

Primary Examiner—Stephen M. Hepperle
Attorney, Agent, or Firm—Clyde E. Bailey

[57] ABSTRACT

An adjustable valve stem apparatus 10 adapted for use in an injection molding equipment or device comprises a cylindrical body 12 comprising internally threaded fixed portion 14 and moveable portion 16 threadably mounted on a double-ended screw 30. The fixed and moveable portions 14,16 are relatively oppositely threaded with threads of essentially equal pitch. Moveable portion 16 has a means 26 for removably mounting a valve stem 28 which communicates with a mold cavity. The double-ended screw 30 has a socket 38 formed in its top portion for adjusting the moveable portion 16 relative to the fixed portion 14 thereby corresponding axially displacing the valve stem 28 from a first to second position relative to the workpiece. In a preferred embodiment, the apparatus 10 may be adjusted from the outside of the injection molding equipment, where equipment uptime is critical to the operation.

14 Claims, 4 Drawing Sheets

ADJUSTABLE VALVE STEM APPARATUS FOR VALVE GATED INJECTION MOLDING DEVICES

TECHNICAL FIELD

This invention relates generally to valve gated injection molding equipment or devices, and more particularly to the use of an apparatus for adjusting the length of a valve stem which communicates with a mold cavity for forming a workpiece.

Conventional injection molding equipment comprises one or more valve actuators which could be pneumatically, hydraulically or mechanically actuated. Typically a central cylinder is contained in the valve actuator and an elongated valve stem is attached to the cylinder, the stem terminating at a valve seat surrounding the opening for filling the mold cavity. In operation, molten plastic is generally pumped through a passage directed along the valve stem and into the cavity. When it is desired to fill the mold cavity, the actuator lifts the valve stem and plastic is pumped along the stem past the seat into the cavity.

A difficulty arises when the valve stem becomes worn, broken or otherwise unusable and requires replacement. The present practice is to remove the entire valve assembly from the molding apparatus, including a substantial portion of the body of the mold, the valve actuator, central cylinder, and valve stem and send it to the shop for reworking. There the entire assembly is heated up to the operating temperature so that the plastic will melt and the actuator and stem can be withdrawn. A new stem is then attached to the actuator. If the new stem is calculated to be too short to account for thermal expansion of the machine parts during operation, then the stem will not seat properly at the entrance to the cavity. If the stem, on the other hand, is calculated to be too long, then the stem may bend when actuated. In practice the optimum length of the stem must be determined by trial and error for each valve, two valves rarely being the same. This process may take a few days for injection molding equipment with several valves and can effectively severely hamper operation of several machines in a production mode.

It is therefore an object of the present invention to provide injection molding equipment having an easily accessible adjustable valve stem apparatus which would alleviate the necessity of removing the entire valve assembly to reposition or replace a worn or otherwise unusable valve stem.

It is also an object of the present invention to provide a method of easily replacing a worn or otherwise unusable valve stem at the injection molding equipment rather than having to disassemble a substantial portion of the structure of the equipment.

Still another object of the invention is to provide a method for appreciably reducing molding operation downtime when replacing and/or repositioning an worn or otherwise unusable valve stem.

Moreover, an important advantage of the present invention is that its use results in appreciably more molding equipment uptime compared to prior art practice.

BACKGROUND ART

U.S. Pat. No. 4,801,051 is directed to a flow control device wherein a micro-axial adjustment of a valve needle which controls fluid flow through a nozzle is employed to compensate for changes in the working liquid viscosity. The valve length adjustment is achieved with a travel adjustment screw so as to either narrow or widen a gap between the valve and the valve seat thus creating commensurate adjustments in the fluid flow. The patent does not, however, teach or suggest a means of changing the valve at the machine when the valve is worn or is otherwise in need of replacement.

U.S. Pat. No. 4,588,163 is directed to a stem travel limiting apparatus wherein an internally threaded annular collar is engaged with a threaded stem. A locking ring is positioned over the collar so that it can exert a force over the collar sufficient to partially close the gap and to force the threads of the stem and collar into distortion. The patent does not teach a means of repositioning or replacing the stem at the equipment when the valve is worn or is otherwise in need of replacement.

SUMMARY OF THE INVENTION

In one aspect of the present invention, an apparatus for adjusting a valve stem in injection molding equipment has a cylindrical body with a fixed and a moveable threaded portion. The fixed portion is threaded opposite to that of the moveable portion and both portions are mounted onto a double-ended screw or nut to form the adjustable valve stem apparatus. The moveable portion has at one end means for removably mounting the valve stem. There is also provided means for rigidly securing the adjustable valve stem apparatus to the molding equipment. The double-ended screw comprises means accessible through the fixed portion for rotating the screw to adjust the moveable portion relative to the fixed portion thereby correspondingly axially displacing the valve stem from a first to a second position relative to the workpiece.

BRIEF DESCRIPTION OF THE DRAWINGS

The foregoing as well as other objects, features and advantages of this invention will become more apparent from the following detailed description when taken in conjunction with the appended figures in which.

BEST MODE OF CARRYING OUT THE INVENTION

Figure 1A:
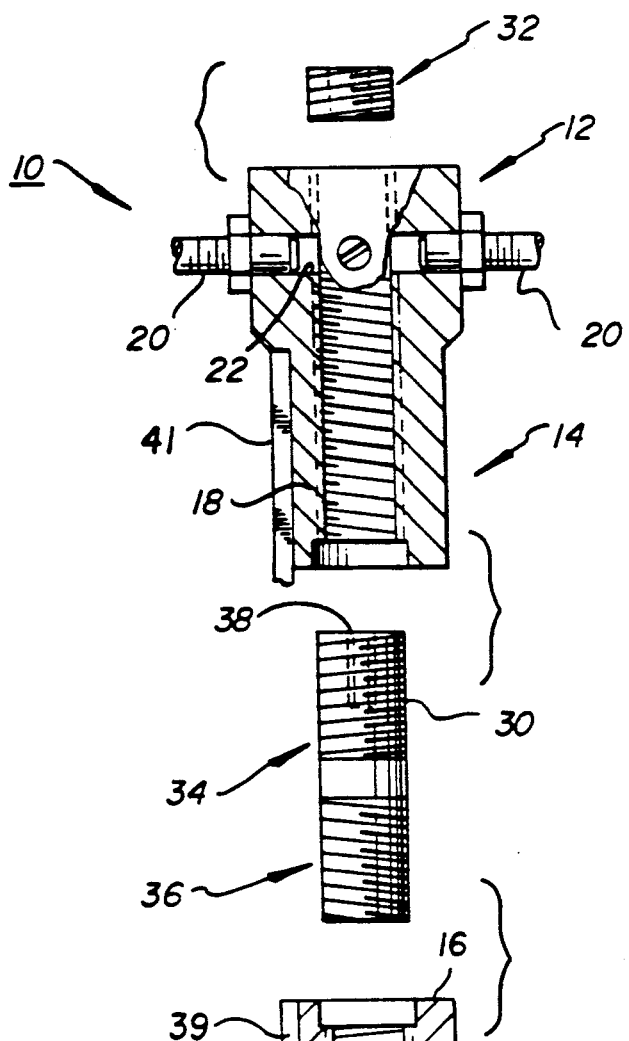
FIG. 1A is an exploded view partially in section of the apparatus of the present invention.

Referring now to the drawings, there is shown in FIG. 1A an exploded view of the adjustable valve stem apparatus 10 in its preferred embodiment comprising a cylindrical body 12 having an fixed portion 14 and moveable portion 16. The fixed portion 14 has means to rigidly secure it to the molding equipment structure. In the preferred embodiment a pair of split shouldered pins 20 cooperating with the injection molding equipment structure extend into a cross bore 22 formed in the fixed portion 16 of the apparatus 10. The moveable portion 16 of the apparatus 10 has at its bottom end 24 a transverse support slot 26 for slideably engaging the cylindrical head 27 of the valve stem 28.

The fixed and moveable portions 14, 16 comprise oppositely threaded axial bores 18 which are sized to threadably engage the ends of a double-ended screw 30 to form the apparatus 10. The pitch (threads/inch) of each of the threaded portions 14, 16 is essentially equal so that clockwise or counterclockwise adjustment of the moveable portion 16 relative to the fixed portion 14 on screw 30 produce substantially the same axial displacement of the stem 28 toward or away from the workpiece. A pitch of less than about 24 threads per inch produced good results.

In another embodiment, the fixed portion 14 of the apparatus 10 has a jam nut 32 threadably secured in bore 18 for restricting movement of the double-ended threaded screw 30 during operation. Nut 32 has a through bore so that an appropriately sized allen wrench can reach through to socket 38 in double-ended screw 30. A key way 39 is formed in longitudinal sections along the external surface of the fixed and moveable portions 14, 16 of apparatus 10 such that when the sections are bought into registered alignment, a key 41 may be inserted to rigidly restrict rotational movement of the fixed portion 14 relative to the moveable portion 16 during subsequent molding operations. Those skilled in the art should appreciate that other anti-rotational arrangements may also be used to stabilize the fixed and moveable portions 14, 16 during operations.

Figure 1B:
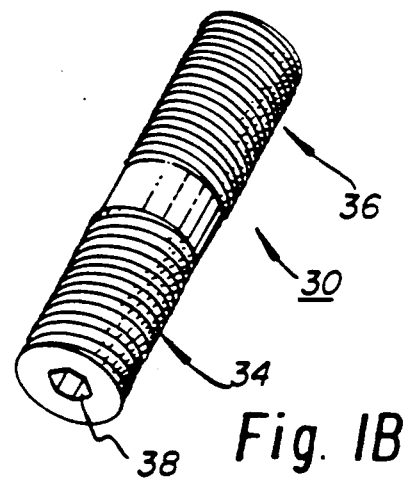
FIG. 1B is a perspective view of the double-ended screw.

Turning now to FIG. 1B, the double-ended screw 30 is shown having threaded portions 34, 36. Portion 34 is threaded relatively opposite to portion 36 and each is sized to engage respectively the fixed and moveable portions 14, 16 of the apparatus 10. A socket 38 for receiving an allen wrench is formed in the end of portion 34 of the threaded screw 30 which threads into the fixed portion 14 of the apparatus 10. Adjustment of the valve stem 28 from a first to a second position is thus achieved by inserting a properly sized allen wrench through jam nut 32 into the socket 38 of the double-ended screw 30 and rotating the double-ended screw 30 in the preferred direction until the valve stem 28 attached to the moveable portion 16 properly engages the workpiece. Those skilled in the art should appreciate that a nut having internal threads for threadably engaging the external threads on the fixed and moveable portions 14, 16 of the adjustable valve stem apparatus 10 may be substituted for the double-ended screw 30. Jam nut 32 is then hand tighten with an appropriately sized allen wrench to restrict the axial movement of the double-ended screw 30 during operation.

Figure 2:
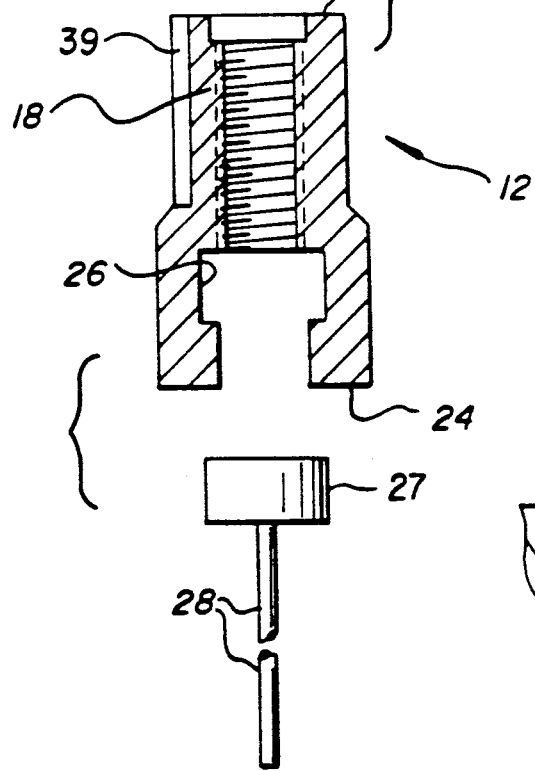
FIG. 2 is a partial sectional view of the injection molding equipment having a valve stem engaged in a seat formed in the workpiece.
Figure 2:
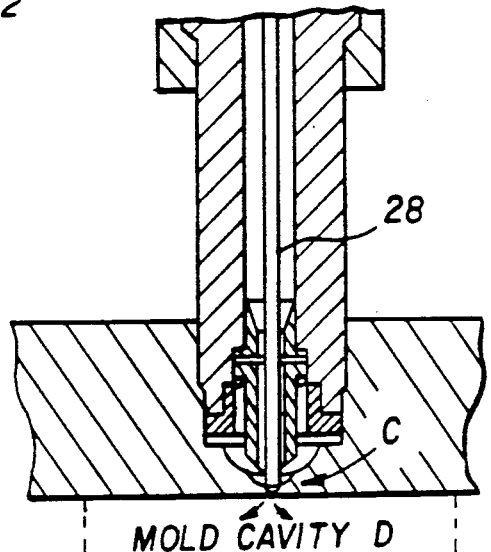

Turning now to FIG. 2, there is shown a partial sectional view of the injection molding equipment having a valve stem 28 communicating with a mold cavity D. Valve stem 28 is shown engaging the seat C in the mold cavity D.

Figure 3:
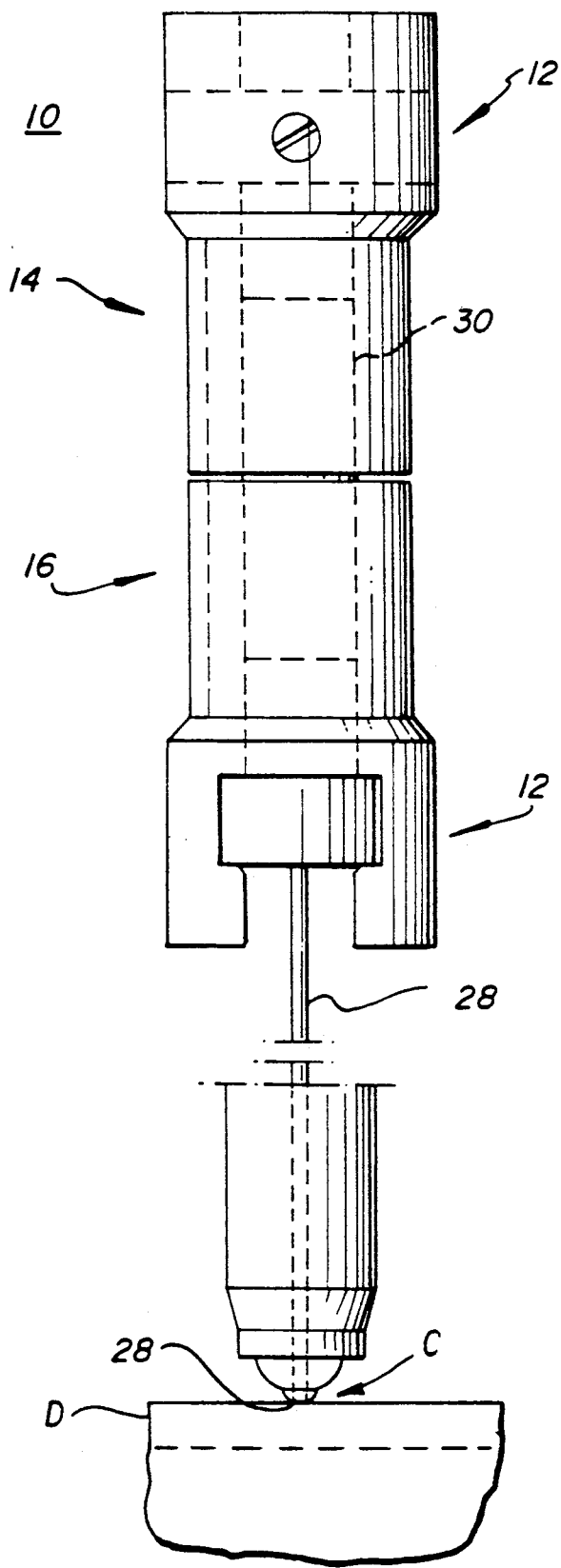
FIG. 3 is an elevation view of the apparatus of the present invention with the adjustable valve stem assembly in a first position.

Turning next to FIG. 3, there is shown an elevation view of the adjustable valve stem apparatus 10 comprising a cylindrical body 12 having an fixed portion 14 and a moveable portion 16, the moveable portion 16 having a valve stem 28 attached thereto. The fixed and moveable portions 14, 16 of the apparatus 10 are shown in a first position relative to the double-ended screw 30 and the valve stem 28 which communicates with a mold cavity.

Figure 4:
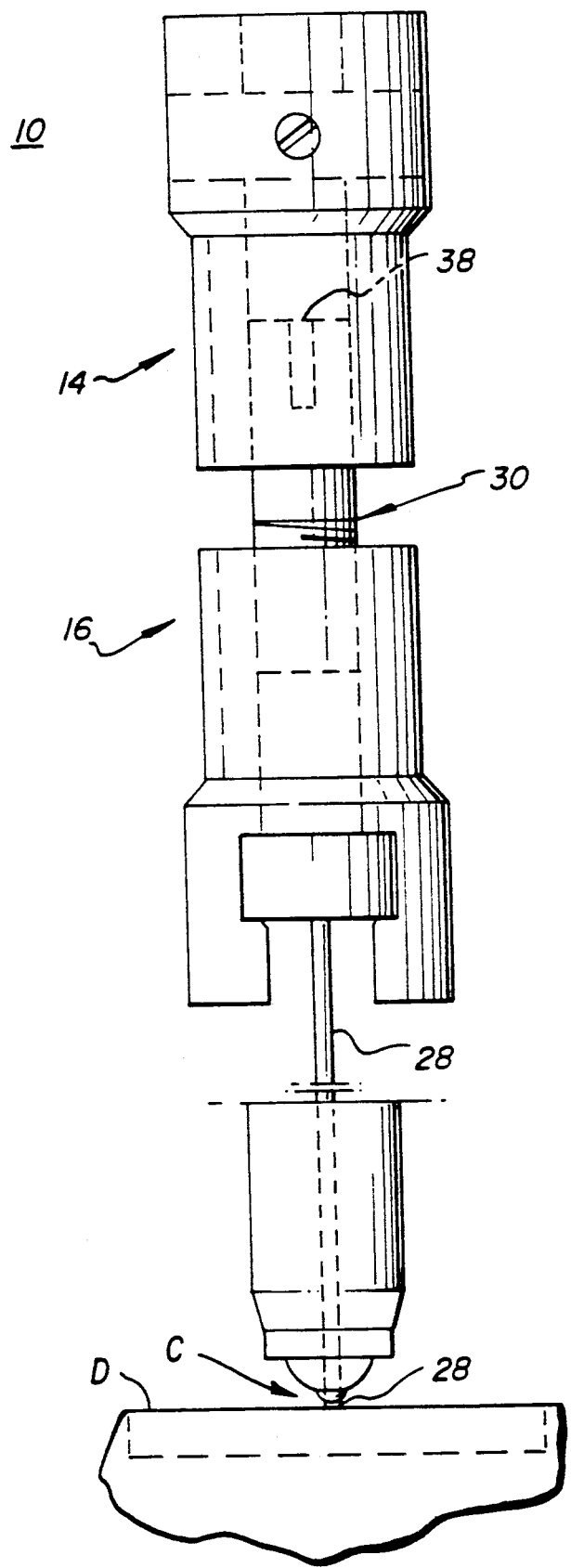
FIG. 4 is an elevation view of the apparatus of the present invention with the adjustable valve stem assembly in a second position.

Turning next to FIG. 4, an elevation view of the apparatus 10 is shown wherein the fixed and moveable portions 14, 16 are shown in a second position relative to the double-ended screw 30 and the valve stem 28. By rotating the double-ended screw 30 in a clockwise direction, the moveable portion 16 of the apparatus 10 is moved away from the fixed portion 14. Conversely, by rotating the screw 30 in a counterclockwise direction, the moveable portion 16 moves towards the fixed portion 14. The valve stem 28 is thereby axially displaced either toward or away from the mold cavity so that it can properly engage a seat at the entrance of the mold cavity.

Figure 5:
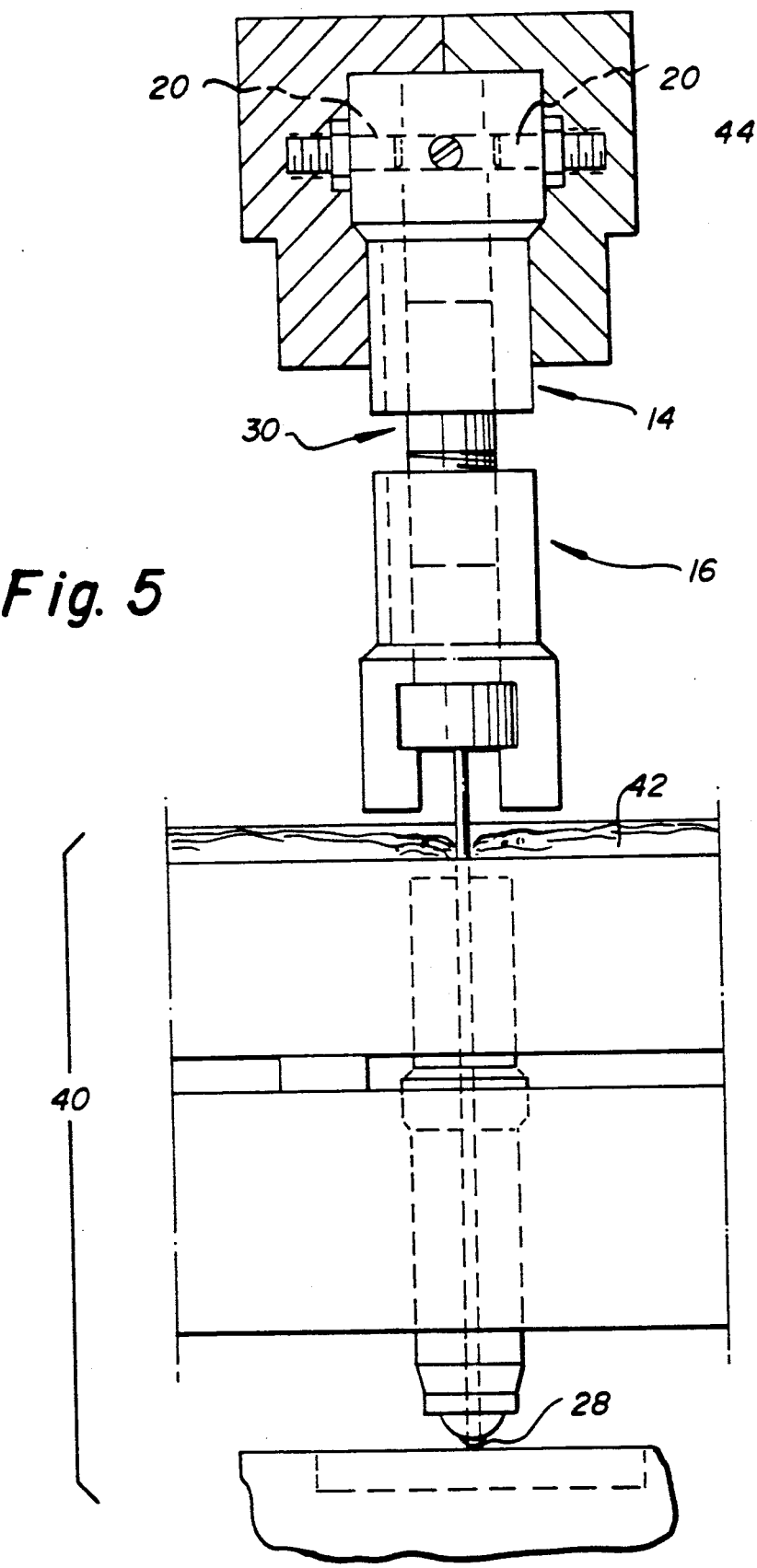
FIG. 5 is an elevation view partially in section of the apparatus of the present invention in molten flow equipment.

Turning finally to FIG. 5, the apparatus 10 in its preferred embodiment is incorporated in a fluid flow device 40, i.e., an injection molding device, where adjustment of the stem 28 is critical to the operation. In operation, the molten flow device 40 is of a type wherein a molten material 42, normally a plastic, is pumped in through passage E and directed along stem 28 toward seat C communicating with the mold cavity D to be filled with plastic. When it is desired to fill mold cavity D, actuator 44, which may be mechanical, pneumatic or hydraulic, lifts the valve stem 28 and the plastic 42 is pumped past seat C to fill the cavity D.

The adjustment or replacement of the valve stem 28 under operational conditions is made very simply by first de-activating the pump for the molten plastic and without reducing the temperature, releasing the actuating means in, for example, injection molding equipment, pulling out the adjustable valve stem apparatus 10 with the valve stem 28 attached, replacing the stem 28 with a new or refurbished one, reinserting the adjustable valve stem apparatus 10 and stem 28, and finally adjusting the stem 28 by first loosening jam nut 32 and then rotating screw 30 in the preferred direction such that the stem 28 properly engages the mold cavity D. Rotation of the apparatus 10 is accomplished by inserting a properly sized allen wrench through the fixed portion 14 of the adjustable valve stem apparatus 10 from outside the molding equipment through jam nut 32 to the socket 38 of the double-ended screw 30 and rotating the screw 30 until the stem 28 is properly positioned. Proper positioning of the valve stem 28 is determined when the stem 28 fully mates with the valve gate and terminates therein. In another embodiment, a jam nut 32, is then inserted into the adjustable valve stem apparatus 10 to prevent the double-ended screw 30 from axially moving during subsequent operation. This process is takes only a couple of hours, without requiring substantial disassembly of the machine or operations downtime.

While the invention has been described with reference to certain preferred embodiments thereof, those skilled in the art will appreciate that various modifications, changes, omissions and substitutions may be made without departing from the spirit of the invention. It is intended, therefore, that the invention be limited only by the scope of the following:

What is claimed is:

1. A valve stem adjustment apparatus adapted for use in the gate valve of injection molding equipment, said apparatus comprising:

a) a cylindrical body, said body comprising a fixed and a moveable threaded portion, said portions being relatively oppositely threaded, wherein said moveable portion has at one end means for removably mounting said stem;
b) means structurally cooperating with said fixed portion for rigidly securing said fixed portion to said equipment;
c) an elongated valve stem slideably engaged to said moveable portion; and,
d) a double-ended threaded element correspondingly threadably engaged to said fixed and moveable threaded portions, said double-ended threaded element having a socket formed in its top portion for rotatably adjusting the moveable portion relative to the fixed portion thereby correspondingly axially displacing the valve stem from a first to a second position.

2. The apparatus of claim 1 further comprising a jam nut incorporated in said apparatus for restricting the axial movement of said double-ended threaded element during operations.

3. The apparatus of claim 2 further comprising means for restricting rotation of said fixed and moveable portions during operation.

4. The apparatus of claim 1 wherein said threaded element is a screw.

5. The apparatus of claim 1 wherein said fixed and said moveable threaded portions are internally threaded.

6. The apparatus of claim 1 wherein said fixed and moveable portions of said apparatus have threads of relatively equal pitch.

7. The apparatus of claim 6 wherein said fixed and moveable portions have a pitch (threads/inch) less than about 24.

8. In injection molding equipment of the type comprising a valve actuating means, a valve stem assembly having a valve stem attached thereto for communicating with a workpiece, the improvement comprising an adjustable valve stem apparatus structurally cooperating with said actuating means, said apparatus comprising
a) a cylindrical body, said body comprising a fixed and a moveable threaded portion, said portions being relatively oppositely threaded, wherein said moveable portion has at one end means for removably mounting said stem;
b) means structurally cooperating with said fixed portion for rigidly securing said fixed portion to said equipment;
c) an elongated valve stem slideably engaged to said moveable portion; and,
d) a double-ended threaded element correspondingly threadably engaged to said fixed and moveable threaded portions, said double-ended threaded element having a socket formed in its top portion for rotatably adjusting the moveable portion relative to the fixed portion thereby correspondingly axially displacing the valve stem from a first to a second position.

9. The equipment of claim 8 further comprising a jam nut incorporated in said assemblage for restricting axial movement of said double-ended threaded element during operations 10. The equipment of claim 9 further comprising means for restricting the rotation of said fixed and moveable portions during operations.

11. The equipment of claim 8 wherein said fixed and said moveable portions are internally threaded.

12. The equipment of claim 8 wherein said double-ended threaded element is a screw.

13. The equipment of claim 8 wherein said fixed and moveable portions of said adjustable valve apparatus have threads of relatively equal pitch.

14. The equipment of claim 8 wherein said fixed and moveable portions of said adjustable valve apparatus have a pitch (threads/inch) less than about 24.

* * * * *